UNITED STATES PATENT OFFICE.

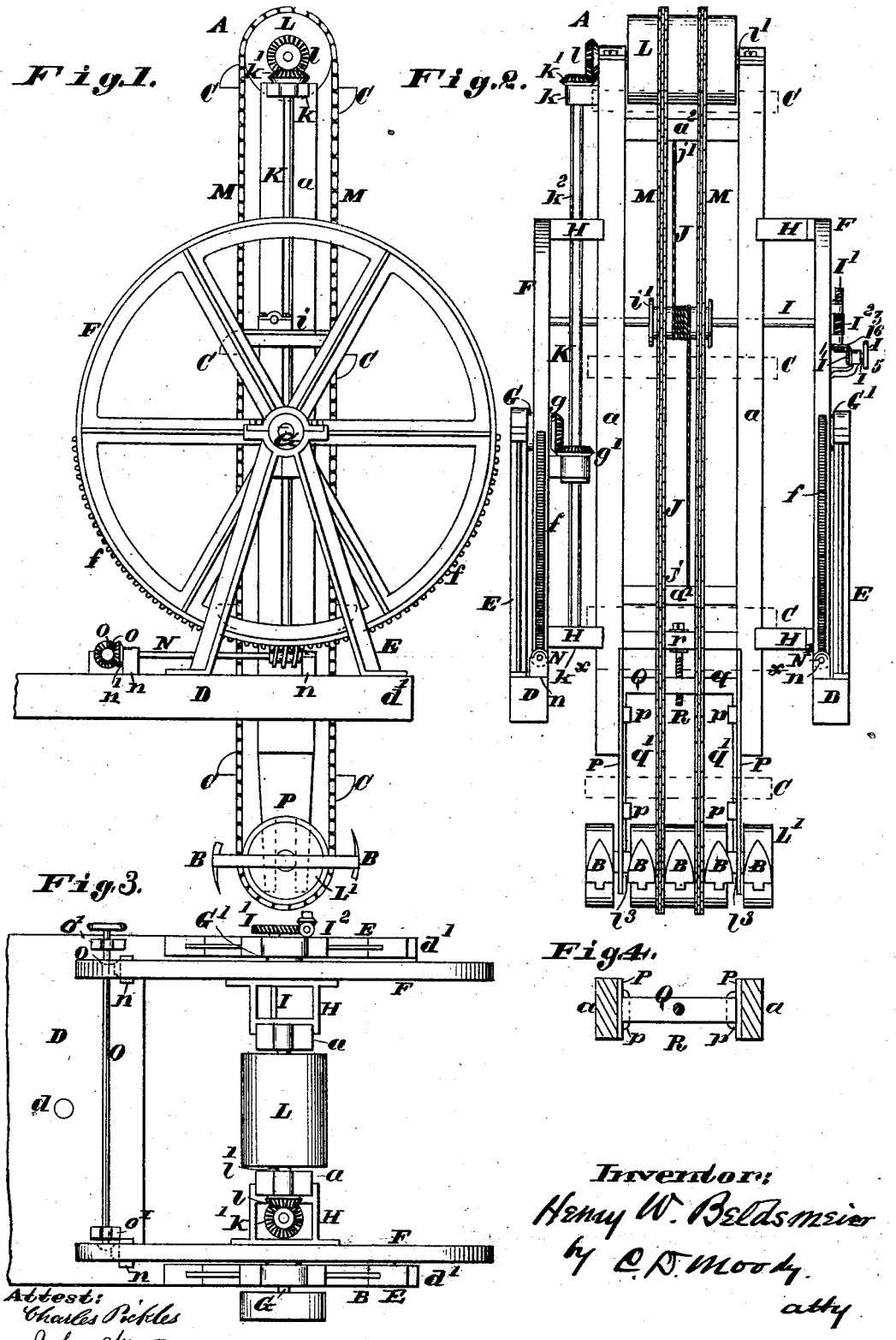

HENRY W. BELDSMEIER, OF ST. LOUIS, MISSOURI.

EXCAVATOR.

SPECIFICATION forming part of Letters Patent No. 248,276, dated October 18, 1881.

Application filed July 22, 1881. (No model.)

*To all whom it may concern:*

Be it known that I, HENRY W. BELDSMEIER, of St. Louis, Missouri, have made a new and useful Improvement in Excavators, of which the following is a full, clear, and exact description, reference being had to the annexed drawings, making part of this specification, in which—

Figure 1 is a side elevation of the machine; Fig. 2, a front elevation; Fig. 3, a plan, and Fig. 4 a detail, being a horizontal section taken on the line $x\,x$, Fig. 2.

The same letters denote the same parts.

I have heretofore, October 19, 1880, patented a device for excavating and elevating earth, consisting, substantially, of the combination of a system of rotating picks, which loosen the earth to be excavated, and a series of traveling shovel-buckets, which take up the loosened earth and elevate it to the desired level, the picks and shovels being held and operated by means of a construction similar to an elevator-leg.

The present invention is supplementary to the device referred to; and it relates to the means for handling the excavator-leg, for turning it horizontally around, raising and lowering it, and tilting it to any desired angle, so that the lower end of the leg can be adjusted to any desired point of excavation.

A represents the leg, B B the rotating picks, and C C C the series of traveling shovels, substantially as in the original construction.

D represents a platform or frame for supporting the entire mechanism. It may be extended to the left, as shown in Fig. 1, suitably to support a boiler and engine, if desired, for operating the excavator; and the platform or frame D is pivoted, as at $d$, to enable it to be swung around horizontally, so as to present the excavating mechanism to any desired point of the compass.

E E represent standards attached to and supported upon the outer end, $d'$, of the platform D. Wheels F F, toothed at $f$, are hung loosely on shafts G G', which turn in the supports or standards E E. The wheels F F are provided with blocks H H, which, in turn, are suitably shaped to receive the frame $a\,a$ of the leg A, and serve as guides for the latter to be moved up and down therein whenever it is desired to let the leg farther down into the ground or into a depression, or to raise it upward when the earth to be excavated is at a higher level. This raising and lowering of the leg is effected as follows:

I represents a shaft journaled in bearings $i\,i$, that are attached to the wheels F F. The shaft I is furnished with a pulley, $i'$. A cord, J, is wound around the pulley $i'$, and at its ends $j j'$ is fastened to the leg A, at $a'\,a^2$, respectively. By rotating the pulley $i'$ the cord J is wound onto it from one end and off at the other end, according to the direction the pulley is rotated. The rotating of the pulley is effected as follows: The shaft I is provided with a gear, I', which engages with a worm, $I^2$. The worm-shaft has a bevel-gear, $I^3$, engaging with a gear, $I^4$, upon the shaft $I^5$, having the hand-wheel $I^6$. By turning the latter, shaft I is rotated and the leg A moved upon the wheels F F and in the guides H H.

The motion is imparted to the excavating mechanism by means of the main shaft G. This shaft, upon its inner end, has a gear, $g$, engaging with a gear, $g'$. The latter is upon the shaft K, which is held and turns in bearings $k\,k$ upon the leg A, and which has a gear, $k'$, engaging with a gear, $l$, which is attached to the shaft $l'$ of the upper drum, L, over which the chains M M of the excavator-shovels C C pass. The motion of the shaft G is thus transmitted to the shaft $l'$ and the excavator mechanism operated. The shaft K is provided with a spline, $k^2$. This enables the leg A to be moved in the blocks H H, as described, and yet keep the shaft K and gear $g'$ in engagement.

N represents a worm-shaft turning in bearings $n\,n$ upon the platform D, and engaging with the wheel G. A similar shaft, N', engages with the other wheel G'. A shaft, O, provided with gears $o\,o$, and turning in bearings $o'\,o'$, engages, through the gears $o\,o$, with gears $n'\,n'$ upon the shafts N N'. By turning the shaft O the wheels F F are rotated on the shafts G G', and by reason of the leg A being connected with the wheels F F, the leg A is tilted from a perpendicular and into any desired inclination to the horizon.

The combined effect of the above-described mechanism is to make the excavating device universally adaptable to all positions from which earth is likely to be excavated, either from the right, left, or front of the platform D, either from higher or lower levels, or by tilting the leg from points remote from the platform. To tighten the chains M when too loose upon the drums L L', the latter drum, L', is held in slotted arms P P, which project from the leg A.

Q represents a part having a cross-bar, $q$, and arms $q'$ $q'$, held and arranged to move in guides $p$ $p$ upon the arms P P, and at their outer ends to bear against the shaft $l^3$ of the drum L'. A screw, R, held and turning in the leg A at $r$, and engaging in the bar $q$, can be made, by suitably turning it, to move the bar $q$, and thus press the drum L' outward and tighten the chains.

I claim—

1. The combination of the leg A, the wheels F F, and the platform D, said leg being vertically adjustable upon said wheels, and the latter being arranged to rotate in bearings upon said platform, substantially as described.

2. The combination of the leg A, wheels F F, and pivoted platform D, said leg being vertically adjustable upon said wheels, and the latter turning in the bearings E E, substantially as described.

3. The combination of the wheels F F, the shaft I, pulley $i'$, cord J, leg A, and guides H H, substantially as described.

4. The combination of the wheels F F, the blocks H H, and the leg A, substantially as described.

5. The combination of the wheels F F, the blocks H H, the leg A, the shafts G G', the gears $g$ $g'$, the shaft K, and the spline $k^2$, substantially as described.

6. The combination of the wheels F F, shaft G, blocks H H, gears $g$ $g'$, shaft K, spline $k^2$, gears $k$ $l$, and the drum L, substantially as described.

7. The combination of the leg A, blocks H H, wheels F F, toothed at $f f$, standards E E, worm-shafts N N', shaft O, and platform D, substantially as described.

H. W. BELDSMEIER.

Witnesses:
C. D. MOODY,
SOLON N. SAPP.